Fig. 1A

Oct. 10, 1950         W. P. ALBERT         2,525,192

POWER TRANSMITTING SYSTEM

Filed Aug. 27, 1946         8 Sheets-Sheet 3

INVENTOR
WALTER P. ALBERT
BY *Joseph B. Roberts*
ATTORNEY

Oct. 10, 1950     W. P. ALBERT     2,525,192
POWER TRANSMITTING SYSTEM Filed Aug. 27, 1946     8 Sheets-Sheet 4

INVENTOR
WALTER P. ALBERT
BY
ATTORNEY

Oct. 10, 1950 W. P. ALBERT 2,525,192
POWER TRANSMITTING SYSTEM
Filed Aug. 27, 1946 8 Sheets-Sheet 5

INVENTOR
WALTER P. ALBERT
BY
ATTORNEY

Oct. 10, 1950      W. P. ALBERT      2,525,192

POWER TRANSMITTING SYSTEM

Filed Aug. 27, 1946      8 Sheets-Sheet 7

INVENTOR
WALTER P. ALBERT
BY John E. Roberts
ATTORNEY

Patented Oct. 10, 1950

2,525,192

UNITED STATES PATENT OFFICE 2,525,192

POWER-TRANSMITTING SYSTEM

Walter P. Albert, Madison, N. J.

Application August 27, 1946, Serial No. 693,293

24 Claims. (Cl. 74—113)

This invention relates to a mechanical power system for transmitting continuous torque through a wide range of amplification and speed ratios, including unity. More specifically, it is a mechanical-variable slip power-shunt type of transmission, wherein, during acceleration, the torque path is gradually changed from the variable-slip channel to the mechanical channel. It is especially well suited for the transmission in automotive vehicles to provide uninterrupted traction from starting to direct drive.

The use of the internal combustion engine as a source of power for automobiles presents a problem in power transmission which, until now, has not been solved satisfactorily. This type of engine needs some form of speed reduction and torque amplification for starting and accelerating together with a rigid mechanical linkage for direct drive. In the past many variable speed ratio schemes have been tried but all such devices have been abandoned in favor of selective gear trains with the associated gear shifting mechanism, such as the familiar "H" shift. But gear shifting operations are annoying and require considerable skill in the coordinated manipulation of the clutch and accelerator pedals in proper time relation with the shift lever. The synchro-mesh device, while reducing gear clashing, does not change the required sequence of manual operations nor materially reduce the time for their completion. An operational fault of the gear train transmissions is the complete interruption of the tractive force during the shifting intervals and this is at times when continuous acceleration should be available. Recent use of the hydraulic coupling or fluid drive transmissions and other flexible couplings for variable speed drive, such as the electric generator-motor combination, have revived hope for the eventual elimination of the gear trains and their attendant shifting equipment. Unfortunately, the limitations of any such variable slip coupling make it impractical as the sole means of power transmission in automobiles.

This invention provides a mechanical-variable slip power transmitting system, which fulfills the requirements for high starting torque, a wide range of continuously varying torque amplification for acceleration and a highly efficient direct mechanical linkage for normal driving. These requirements are fulfilled, automatically, by the sole use of the accelerator pedal for all speed regulation without gear trains, gear shifting equipment or friction clutch.

Accordingly, the primary object of this invention is to provide a power transmitting mechanism between a power source and an output shaft, such, that, through wide variations in speed, the torque amplification is continuously variable and automatically controlled and, wherein, at unity speed ratio, a direct mechanical coupling is imposed.

A specific object of this invention is to provide a power transmission for automotive vehicles without selective gear trains or gear shifting mechanism.

A feature of the invention is a power dividing arrangement, whereby torque is transmitted through two channels and varied between them automatically by the torque requirement and the speed.

Another object is to provide smooth uninterrupted tractive force during acceleration.

Another object of the invention is to impose automatically a rigid mechanical linkage with no backlash when the speed and torque requirement are such that direct engine torque is sufficient for such coupling.

Another object is to attain highly efficient power transmission under all conditions and particularly with the absence of drag or friction in the direct drive condition.

A further object is to eliminate the friction clutch and clutch pedal as well as the gear shifting lever with the result that driving is reduced to the simplest possible manual operations.

Other objects and advantages will appear on consideration of the following functional analysis, description and drawings of the presently preferred embodiment of the invention.

In the drawings:

For the purpose of functional analysis the following diagrammatic drawings are used:

Fig. 8A to illustrate the overruning clutch, Fig. 8B to illustrate a reversible cam drive, Fig. 8C to illustrate the dynamic principle of the tilting wedge, Fig. 8D to illustrate a later phase of Fig. 8C, Fig. 9A to illustrate the principle of Figure 8C applied to rotary motion, and Fig. 9B to illustrate a later phase of Fig. 9A;

In operating a motor vehicle equipped with the mechanism of this invention the driver, as formerly, chooses the direction of vehicle movement, forward or backward. As herein shown, a simple manner of recording this choice is to move a control lever from a neutral to a forward position for forward movement and the same lever to a reverse position for backing. With the control lever in neutral the engine may be started and run at any speed without any tendency to move the car. With the engine at idling speed the control lever may be moved to either the forward or reverse position with only a slight tendency to move the car, which is overcome by the parking brake. To start vehicle movement the driver releases the parking brake and actuates the accelerator pedal. All subsequent operations are controlled by the normal use of the accelerator to start, accelerate and regulate speed and of the brake to decrease speed. From the first movement of the car, the traction is continuous and the driver will not know or need to know when direct coupling is accomplished; in fact, this will occur at different speeds under different conditions. To stop the vehicle the driver releases the accelerator and applies the brake in the usual manner. The engine acts as a brake until the car slows down to a speed corresponding to the idling speed while the car is brought to a full stop by the brake. At any stage of slowing down or after a full stop, the vehicle movement may be resumed by again actuating the accelerator to obtain the desired speed. Under the direct drive condition there is a rigid mechanical linkage between the engine shaft and the drive shaft with no slippage, no backlash and no friction loss.

The wedge is the basic principle of mechanism upon which this invention operates. Use is made of the feature of a wedge whereby, neglecting friction, a gain in force is obtained directly proportional to the displacement. In order to transmit continuous torque for rotary motion a number of wedges are mounted upon a disc directly connected to a drive shaft in such manner that they are successively acted upon by a roller brought into wedging engagement.

For an understanding of the related functioning of the power transmission elements used in this invention, it seems desirable, first, to disclose and analyze the principle of operation of the wedge and the manner in which it is applied. This will be done by reference to the series of simple sketches, Figs. 8A to 8D, 9A and 9B, following which the schematic diagram Fig. 10 and the mechanical drawings will be fully described and explained.

Figure 8A:
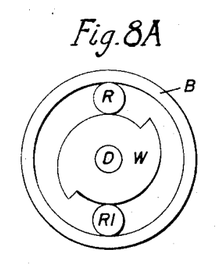

One familiar form of wedge, which has been used for transmitting torque, is the overrunning clutch better known in connection with automobiles as the free wheeling device. This arrangement is mentioned here simply to indicate how torque has been transmitted by a form of rotary wedge such as illustrated in Fig. 8A. If a rim B is connected to an engine shaft rotating in a counter-clockwise direction, then rollers R and R¹ will be rolled into engagement with the higher projections of rotary wedge W, which, in turn, is rigidly connected to drive shaft D. This causes wedge W and shaft D to rotate in the same direction and at the same speed as rim B and torque is transmitted. If shaft D and wedge W should roate faster than rim B, then the rollers are disengaged from the wedging condition and the free wheeling condition exists, whereby, the car may coast at a speed greater than the corresponding speed of the engine and no torque is transmitted in the reverse direction.

Figure 8B:
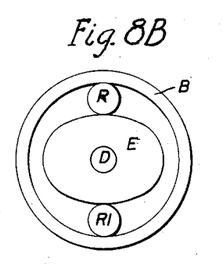

The ellipse is an effective form of rotary cam and because of its simplicity is used to disclose the operating principle of this invention. Fig. 8B illustrates how an ellipse may be used as a rotary cam to produce results similar to Fig. 8A except, that a wedging action occurs in either direction. If the construction of ellipse E is such that the rollers R and R¹ just clear, when at the short diameter, then a rotary motion of rim B will wedge the rollers against E in such a manner that it and shaft D are driven in the same direction and at the same speed as rim B and torque is transmitted. Now, if the speed of shaft D and cam E should exceed that of rim B, then the rollers are disengaged momentarily but immediately are forced into engagement on the other side of the short diameter of E, so that rim B is driven by ellipse E and torque is then transmitted in the reverse direction. It is apparent that the so-called free wheeling condition does not exist in this arrangement. Obviously, there will be backlash or a certain amount of relative angular motion between rim B and cam E when changing from the driving to the driven condition and vice versa.

Figure 8C:
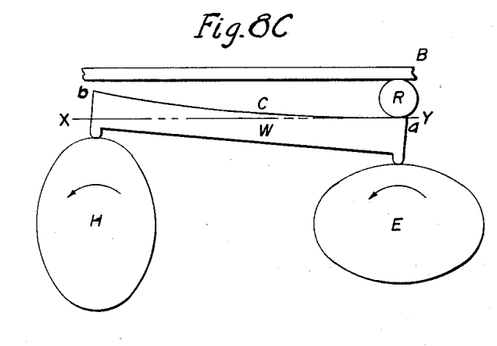
Figure 8D:
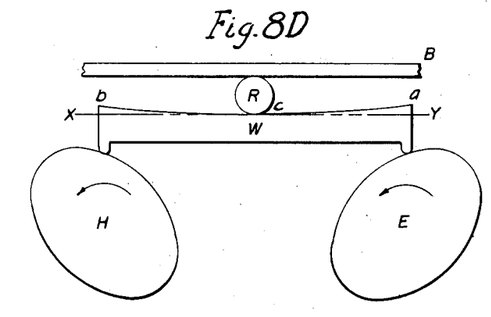

The foregoing wedging arrangements are static by nature, that is, the roller, once engaged, does not move with respect to the contacted cam surface, hence, only a direct speed ratio can result. However, a dynamic method of wedging will now be illustrated and described, wherein the roller moves with respect to the wedging surface and the wedging engagement is determined not by the absolute speed but by the relative speed of two cams. Fig. 8C illustrates how the tilting of wedge W by the rotary motion of cams E and H permits the roller R to roll on a line X—Y and just contact the face of the wedge and plane B. Cams E and H are rotating counter-clockwise and are coordinated with the movement of roller R so that the latter moves from point a to point b of wedge W while the cams are rotating 90 degrees. It is apparent that under these conditions cams E and H, if linked with roller R, can rotate at any speed without any wedging action to lift roller R above line X—Y, provided the cams always rotate at the same speed. A certain change in the relative speed of the cams, however, will produce wedging. Fig. 8D shows the same arrangement as Fig. 8C except 45 degrees later. It illustrates how the tilting of the wedge W by the motion of cams E and H permits the face of the wedge to be concave; that is, points a and b are higher than point c under this condition. It will thus be noted, that, while the cams E and H rotate at a uniform speed, the tilting of wedge W prevents wedging action but, if cam E is rotated faster than cam H or if cam H is rotated slower than cam E, then a wedging engagement results. Thus a change in the relative speed, regardless of the actual speed of the two cams, causes the wedging action. It should be noted, especially, that, if both cams stop motion, such as at the 45 degree point, the subsequent independent movement of roller R in either direction will cause wedging action.

Figure 9A:
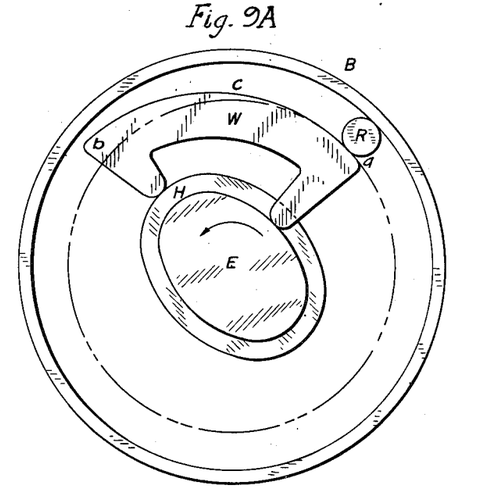
Figure 9B:
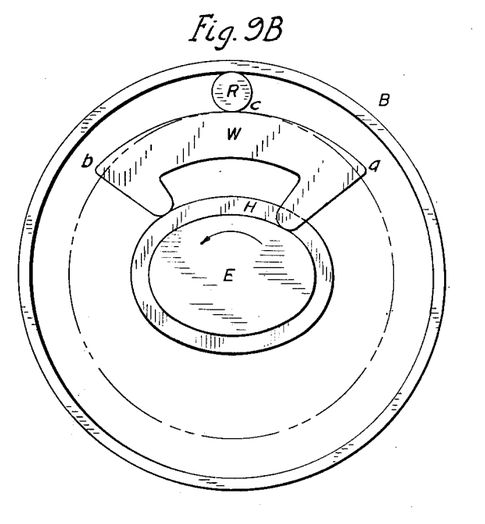

Fig. 9A shows the cams E and H of Fig. 8C mounted concentric and wedge W shaped so that the points of contact with the cams are 90 degrees apart with respect to the same center. If cams E and H rotate at the same speed and roller R is mechanically linked to the cams so it passes over the face of wedge W at the same rotational speed as the cams, then roller R will just contact wedge W along a circumferential line, shown as a broken line, and there is no wedging action with another circumferential line B representing a solid rim. Now, if at the same time wedge W is enabled to rotate slowly about the common center, the tilting of wedge W takes place more slowly because the relative speed of cams E and H with respect to the wedge is reduced but since roller R is linked mechanically to cams E and H, its movement across the face of wedge W is correspondingly reduced; hence, the foregoing relationship of no wedging action continues to exist. Thus, so long as cams E and H are linked to roller R they can rotate at any speed and wedge W may be standing still or rotating and there will be no wedging action between roller R and rim B at any time. Fig. 9B shows the relationship of Fig. 9A 45 degrees later. In this condition points $a$ and $b$ are above the circumferential line of contact (broken line). The tilting of wedge W by the rotation of cams E and H permits the face of the wedge to be less convex than the circumferential line; hence, if cams E and H stop relative motion with respect to wedge W, such as results if wedge W attains the same rotary speed as the cams, then roller R is effectively trapped, so that movement in either direction will produce a static wedging condition similar to that of Fig. 8B.

Figure 1A:
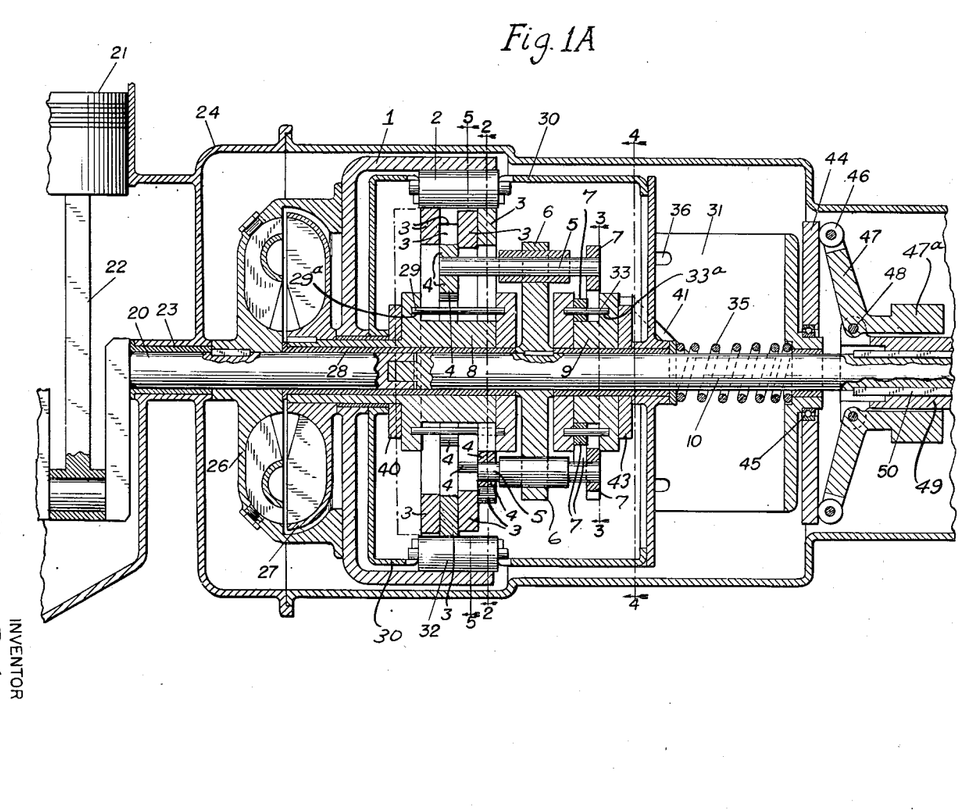
Figs. 1A and 1B, together, show a complete assembly in longitudinal section.
Figure 1B:
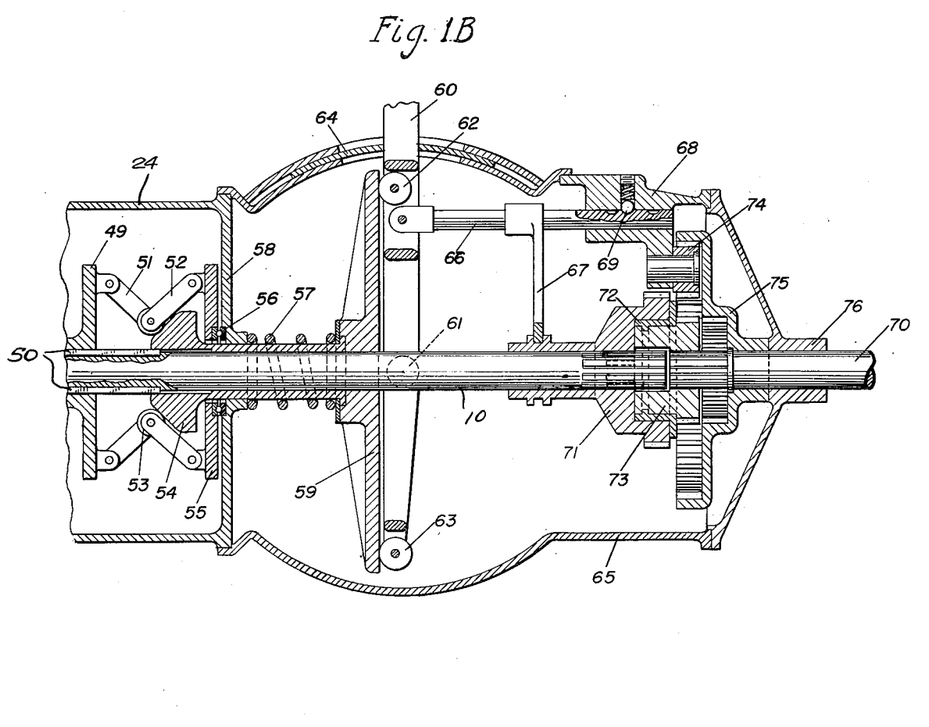
Figure 10:
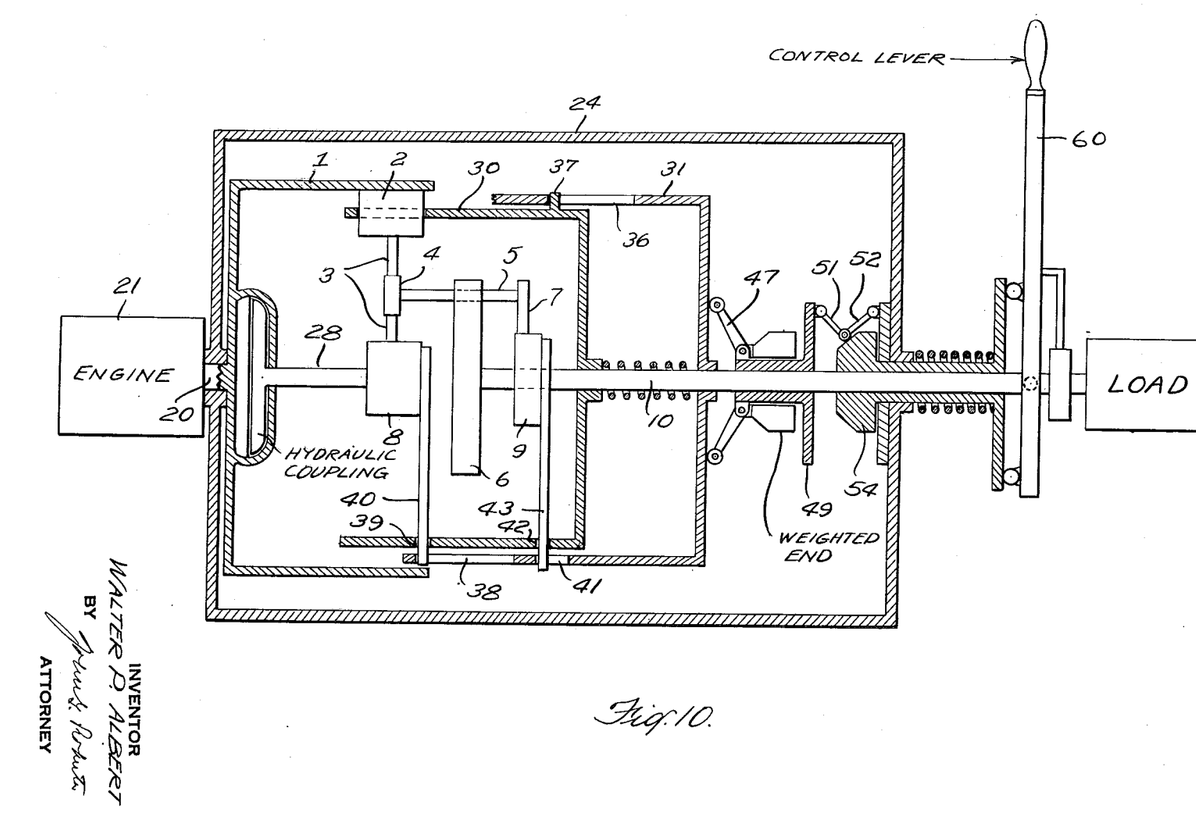
Fig. 10 is a schematic representation of the power transmission system.

The arrangement and operating characteristics of the parts utilized in the described embodiment of the invention may be generally visualized by reference to Fig. 10, which is schematic diagram of the more orderly representation in Figs. 1A and 1B and other mechanical views. The following brief outline makes particular reference to this diagram together with Fig. 7, which views axially one conception of the wedging elements in a mechanical relationship, and Fig. 6, which indicates how the relative angular movements of the cams and rollers are controlled.

Engine 21 is connected through its crank shaft 20 directly to driving rim 1 and through a hydraulic coupling and a shaft 28 to cam 8. A disc 6, which carries a series of rocker shafts 5, is connected directly to the counter-shaft 10 and thence through the gear shift to the load. Each rocker shaft terminates at one end in a cradle 4 and at the other end in an arm 7, both rigidly attached. The arm engages cam 9. A freely held wedge engages the cam 8 at its leading end 3a and the cradle 4 at its trailing end 3b. Roller 2 carried by cage 30 is in position to be engaged by the face of the wedge and, subsequently, to be moved into contact with rim 1 under control of the cams. These elements 5, 4, 7 and 3 which constitute, together with the roller 2, a wedging system are rotatably carried by the disc 6 and serve as a combined controlling and driving link during acceleration. This wedging system first controls the power transmitted through the slip coupling to the load and finally takes over as a direct driving link, completely shunting the slip coupling. In the form to be described, the slip coupling is a hydraulic coupling.

The cam 9, roller cage 30 and a control drum 31 have separate bearings on the counter-shaft. The control drum is movable axially over the roller cage in two stages. A pin 37 on the cage, extending through a longitudinal slot 36 in the drum, permits such axial movements while insuring that the drum and cage shall always be held against relative angular movements. Cams 8 and 9 are initially interlocked with both the cage and the drum. An arm 40, which is rigidly fixed to cam 8, extends through an angularly disposed slot 39 in the cage and an opening 38 of special formation in the drum, the shape of this opening being such that, upon the initial axial movement of the drum, caused by the operation of the control lever 60 acting through a plunger 54, double links 51, 52, a thrust ring 49 and bell-cranks 47, cam 8 is free to advance, rotatably, a few degrees ahead of the cage under the driving force of the engine acting through the hydraulic coupling. An arm 43, which is rigidly fixed to cam 9, extends through another angularly disposed slot 42 in the cage and a camming slot 41 in the drum, the shape of this camming slot being such that cam 9 remains angularly interlocked with the cage and drum during the initial axial movement of the drum but is forced to lag, rotatably, a few degrees behind the cage when, subsequently, the drum is given a further axial movement under centrifugal force exerted by the weighted arms of bell-cranks 47 as the counter-shaft approaches direct driving speed.

Figure 7:
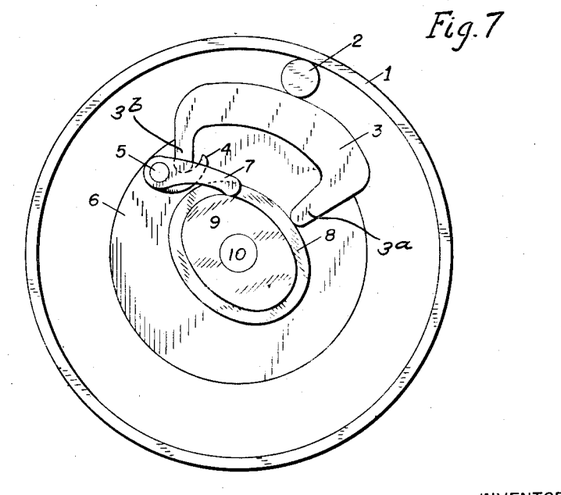
Fig. 7 is a simplified drawing of the transmission elements.

Fig. 7 may be recognized as, essentially, a modified arrangement of Fig. 9B. Rim 1 is to be understood as rigidly connected to the engine shaft and rotatable in a counter-clockwise direction. Roller 2 is carried by bearings on the cage (omitted here for simplicity) which allows slight radial movement of the roller to permit it to be moved into engagement with rim 1 by a slight radial movement of wedge 3. The leading end 3a of wedge 3 rests upon cam 8 while the trailing end 3b is cradled in an arm 4 rigidly connected to shaft 5, which has its bearing in disc 6 keyed to counter-shaft 10. The other end of shaft 5 is rigidly connected to arm 7, which bears upon cam 9. Details 7, 5 and 4, therefore, are capable of slight rocking motion about the bearing in disc 6, so that, as arm 7 follows the face of cam 9, the trailing end 3b of wedge 3 will be moved up and down by the arm 7 and cradle 4. This motion, together with the direct movement of the leading end of the wedge by cam 8, produces the necessary tilting or rocking motion of wedge 3. This action, as previously shown, permits the face of the wedge to be less convex than the circumferential line of contact of the inner face of roller 2. The cage, which carries roller 2 in a rotary motion about shaft 10, is initially linked, mechanically, with both cams 8 and 9. The mechanical linkage provides that the roller is over the leading end of the wedge soon after that end of the wedge has passed the low point of cam 8 and the roller leaves the trailing end of the wedge before arm 7 reaches the low point of cam 9. The face of the wedge is shaped so that as this linked mechanism rotates at any speed the camming action tilts the wedge to permit the roller just to clear the face of the wedge. Also, since the tilting of the wedge 3 is a result of the rotational movement of the cams 8 and 9 with respect to the wedge, it is apparent that the same relationship holds with respect to roller 2 and the face of the wedge 3 regardless of whether wedge 3 is in angular rotation with disc 6 or not. If, while in the relative positions shown, the cam 8 is disengaged from its mechanical linkage with cam 9 and the cage carrying roller 2 and force is exerted by the hydraulic coupling tending to rotate it in a counter-clockwise direction faster than the engaged mechanism, then cam 8 will lift the leading end of wedge 3 so that roller 2 is lifted into engagement with rim 1. As soon as this occurs and, assuming disc 6 and wedge 3 are not rotating, the cage and cam 9 will immediately come to a rotational speed of one-half that of rim 1. Cam 8, though slightly in advance, will also assume approximately the same speed. This slowing down of cam 8 increases the slippage, in the hydraulic coupling, and since cam 8 is not mechanically linked to cam 9 and roller 2, it will tend to rotate faster than these elements. Cam 8, being thus driven ahead of the other mechanism by the torque supplied through the hydraulic coupling directly from the engine, causes wedge 3 to use its contact with roller 2 as a fulcrum. Wedge 3 being a free link, therefore tilts about its contact with roller 2 and as the leading end of wedge 3 is lifted by cam 8, the trailing end is moved a short distance along the face of cradle 4 in a circumference of a circle having the contact point of wedge 3 with roller 2 as a center. This results in a rotational movement of disc 6 by a force applied through cradle 4 to shaft 5, thence, to disc 6. However, arm 7 permits cradle 4 and the trailing end of wedge 3 to tilt according to the normal speed of cam 9 so that the turning of disc 6 will be an increment resulting from the advancing of cam 8 relative to cam 9. By this unique arrangement, whereby wedge 3 momentarily tilts slightly about its contact with roller 2, the torque transmitted by the hydraulic coupling mechanism is multiplied many times by the wedging action of cam 8 and applied directly to cradle 4, thence, to the rotation of disc 6. Of course roller 2 progresses toward the trailing end of wedge 3 while this action takes place; hence, the ratio of the forces with respect to the fulcrum point gradually changes so as to further increase the force of wedge 3 upon cradle 4. However, the face of cradle 4 is shaped so as to become increasingly steeper to the movement of wedge 3 so that the resultant force applied through shaft 5 to rotate disc 6 can be made uniform for the full period of contact of roller 2 with wedge 3. In addition, the constantly increasing steepness of the face of cradle 4 insures that disc 6 will be accelerated to a maximum commensurate with the torque applied to cam 8. This is true because the rate of increase in rotation, or acceleration, of disc 6 due to the increasing slope of the face of cradle 4, continues until the full torque transmitted by cam 8 is completely balanced by the acceleration of disc 6 against its reactive load. This motion of disc 6 results in the initial vehicle movement and causes all the wedges, other than the one in contact with roller 2, to start rotating with the disc. Thus, the result of the first contact of roller 2 with rim 1 and a wedge 3 is to accelerate disc 6 a maximum amount while in contact with that wedge in direct proportion to the torque supplied through the hydraulic coupling mechanism.

In order to apply the foregoing principle of operation continuously, it is necessary to provide a plurality of wedges identical with wedge 3 mounted upon disc 6 through a corresponding number of equally spaced shafts 5. This provides for overlapping of the wedge faces so that roller 2 acts virtually as a roller bearing between the rim 1 and continuous wedge faces. Therefore, whatever wedging action takes place on one wedge face is repeated on each subsequent wedge so the resultant movement is cumulative. In order to neutralize radial pressures, it is desirable to provide two rollers mounted in similar manner on the same cage but spaced exactly opposite. Thus with cams 8 and 9 having 180 degree symmetry and with any even number of wedges, there will be identical action, simultaneously, on opposite sides of the mechanism and the resultant radial pressures will balance. As previously shown, the same relationship of the wedging elements is maintained while the wedges themselves together with disc 6 continue to increase in speed.

Figure 6:
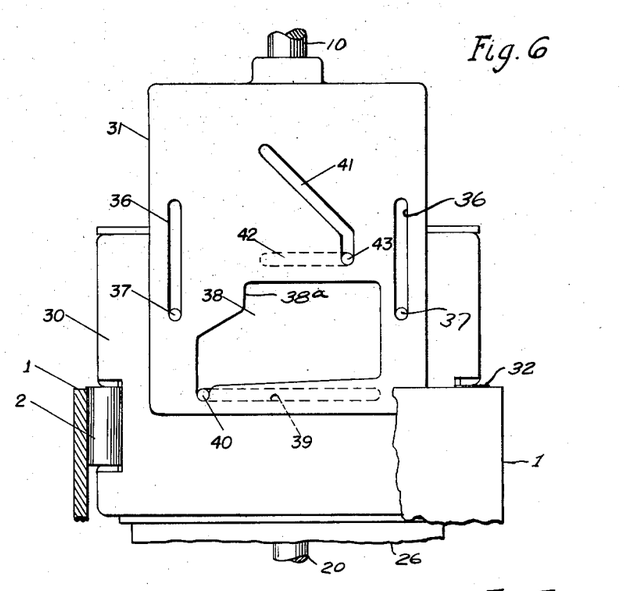
Fig. 6 is a side view showing the control drum in development.

Having disclosed the principle of operation, reference is now made to Figs. 1A and 1B, which together show a sectional assembly of the entire transmission unit. Crank shaft 20 is part of an internal combustion engine also partially shown by piston 21, and connecting rod 22. A short extension of the engine shaft is supported by a main bearing 23, which, in turn, is carried by the engine block and eventually by the chassis. The front end of transmission case 24 is also carried by the same support as the engine. Inside the transmission case a flange detail 26 is keyed to engine shaft 20 and supports the impeller vanes of the hydraulic coupling. Flange 26 extends over the runner 27 to a rigid coupling by bolting, or similar fastening, to another flange, the horizontal extension of which is, hereafter, referred to as rim 1. This rim 1 has an additional bearing upon the sleeve or hollow shaft 28. The runner 27 of the hydraulic coupling is keyed or otherwise fastened to the sleeve 28, which is rigidly connected to cam 8. Cam 8 and sleeve 28 have a long bearing upon the remaining end of shaft 20 and extend onto countershaft 10, which also has an alignment bearing in the end of shaft 20. Mounted alongside each other and equally spaced, circumferentially, are a series of wedges directly in contact with the face of cam 8 and the exact number of which is optional. It is assumed for Fig. 1A that the total number of wedges is twelve arranged in four groups of three wedges each, identified by the numeral 3. One end of each wedge is held in contact with the face of cam 8 by means of a pin 29 which runs in a race 29a at each end of cam 8. Cage 30 has bearings supported by sleeve 28 at one end and at the other end by shaft 10. Cage 30 is cylindrical and at two directly opposite points provides bearings for rollers 2 and 32, mounted in openings through the cylindrical face of the cage. These rollers have bearings at each end, which permit free rotation and also a slight amount of radial movement to enable them to be brought into engagement with rim 1 by a slight outward radial movement of wedge 3. Keyed to shaft 10 is disc 6, which provides long bearings, equally spaced, near its circumference for through shafts, one of which is identified as 5. There will be one shaft 5 for each wedge 3. Hence, the twelve shafts 5 and associated bearings in disc 6 are 30 degrees apart. The end of shaft 5 toward the engine carries cradle 4 rigidly fastened thereto and which, in turn, forms a seat for the trailing end of wedge 3. Cradle 4 is more clearly shown in Figs. 2 and 7. The other end of shaft 5 carries arm 7 also rigidly keyed or otherwise fastened thereto. The other end of arm 7 rests upon the face of cam 9 and is held in contact with that face at all times by pin 33, which runs in a race 33a at each end of the cam. There is an arm 7 for each shaft 5, hence, as assumed, a total of twelve. These arms are alternately mounted in two planes so as to avoid interference between adjacent arms. The arms 7 are more clearly shown in Figs. 3 and 7. Cam 9 has a bearing supported by shaft 10. The outside cylindrical surface of cage 30 is loosely fitted with a cylindrical control sleeve or drum 31, which also has a bearing upon shaft 10. This control drum 31 is capable of axial movement upon cage 30 and shaft 10. Between the end of cage 30 and the control drum 31 is an expanding spring 35, coiled about shaft 10, which insures normal maximum separation of these elements and requires a certain amount of force to displace the drum 31. A side view of control drum 31 is shown in Fig. 6. Mounted upon a hub of the control drum 31 is a thrust bearing 45 carrying thrust plate 44. Engaging thrust plate 44 are a number of rollers 46 each carried by one arm of a bell-crank 47 which is hinged by pivot 48 to thrust ring 49. The thrust ring 49 is keyed to shaft 10 by key 50 in such a manner that it revolves with shaft 10 but also can be moved axially on the shaft. The other end of the bell-crank 47 is a weighted arm 47a normally held down upon thrust ring 49 by the action of spring 35. The number of bell-cranks used is optional but they should be mounted so as to equalize the thrust on plate 44 and also for dynamic balance. Hinged to thrust ring 49 are an optional number of double links connecting to a thrust plate 55, which has a thrust bearing 56 against the end 58 of the transmission case 24. A pair of links are identified as 51 and 52 and at their junction carry a roller 53, which is free to rotate on a pivot. This roller 53 rests upon a cone-shaped part of plunger 54 which also is capable of axial movement on shaft 10 and key 50. The plunger 54 has a sleeve, which connects to lever thrust plate 59. An expanding spring 57 maintains the plunger 54 and lever thrust plate 59 normally in the position shown. Lever thrust plate 59 has a slidable bearing upon shaft 10. Shift lever 60 is mounted upon a pivot 61, fastened to the casing and in transverse alignment with shaft 10. The shift lever 60 carries two pinned rollers, 62 above and 63, an equal distance below, the mounting pivot 61. The control lever projects through a slidable shield 64 in the housing 65 and by forward or backward manual operation determines the direction of movement of the vehicle. The shift lever 60 also carries a gear shift arm 66 capable of movement forward, or toward the engine, by a forward operation of the shift lever and backward, or away from the engine, by a backward operation of the same lever. The shift arm 66 carries an adjustable shift fork 67. The shift arm 66 has a sliding bearing in a housing detail 68 which carries a spring actuated detent ball 69. Ball 69 acts upon three grooves in the shift arm 66 to retain it in position when set in neutral, forward or backward positions. The shift fork 67 engages a groove on the slidable gear 71 which is capable of movement in either direction along splines of shaft 10. Gear 71 carries an attached bearing collar 72 which by means of an inward projection causes gear 73 to move axially with gear 71 but makes them independent in angular rotation. Gear 73 is internally splined and is fitted to and capable of axial movement along splines on the end of drive shaft 70. The end of shaft 10 has corresponding splines so, when the shift lever 60 is operated to the forward position, the internal splines of gear 73 engage the splines of shaft 10 as well as those of shaft 70 and the two shafts are effectively locked together. If the control lever 60 is operated to the backward position, then gear 71 is moved backward or away from the engine and engages the pinion gear 74, which is mounted on a bearing on the housing detail 68. At the same time gear 73 is moved axially with gear 71 to engage the reverse gear 75 to couple it to drive shaft 70. Gear 75 is always in mesh by internal teeth with the pinion gear 74. Hence, the splines of shaft 10 drive gear 71 which rotates the pinion gear 74 which then drives reverse gear 75, which in turn is engaged with gear 73, which through its splines drives shaft 70 at a reduced speed ratio and in a reverse direction to shaft 10. Shaft 70 passes through a main bearing 76 which is part of the end of the gear case.

Figure 2:
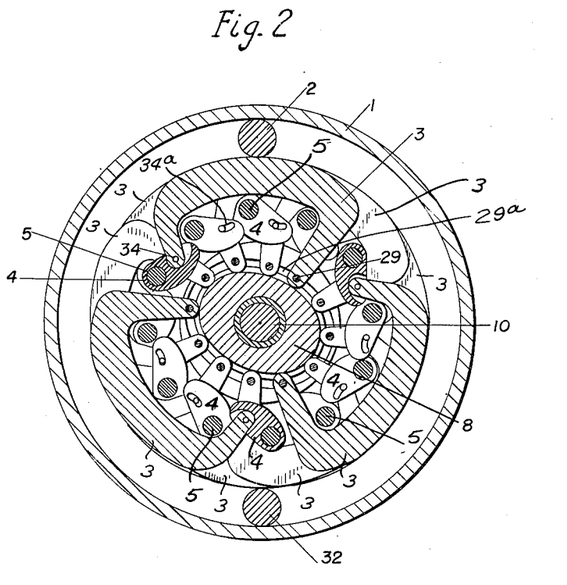
Figs. 2 to 5 are views in transverse sections 2—2, 3—3, 4—4 and 5—5, respectively, of Fig. 1A.
Figure 3:
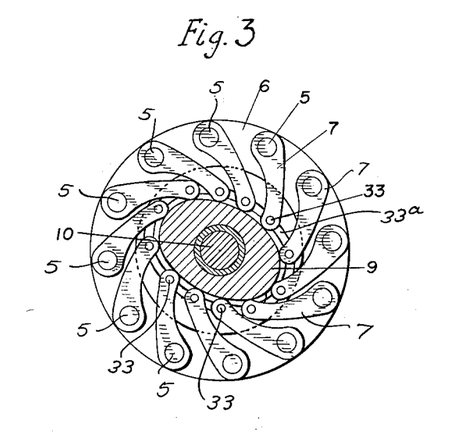

Fig. 2 shows in section, looking toward the engine, but omitting the transmission case, the arrangement of one group of three wedges, also the relative position of the additional three groups of the assumed total of twelve. The relation of each wedge, 3, is shown with respect to cam 8 and its respective cradle 4. The wedges in one angular plane are 120 degrees apart; therefore, each wedge spans three shafts 5 and rests upon the cradle of the fourth shaft. Ample clearance is provided for the relatively small movements of the wedges. The position of the wedges, when not in contact with roller 2 or 32, is of no consequence; however, each is held at its leading end in position against the face of cam 8 by pin 29 and at its trailing end in the cradle by pin 34, which is free to move in a short race 34a in the cradle itself. These pins are concentric with the contact faces of the wedge and the race 34a extends in an arc concentric with the face of the cradle. There is no binding of the pins in their respective races as the wedges are tilted. Fig. 3 shows in section, looking toward the engine, but omitting details beyond disc 6, the arrangement of arms 7, each of which is rigidly fastened to its shaft 5 on the side of disc 6 opposite that on which the cradle is fastened. To avoid interference with adjacent arms 7, when on the high portion of cam 9, these arms are mounted alternately in adjacent angular planes. The free end of each arm 7 is held against the face of cam 9 by pin 33 which runs in a race 33a at each end of the cam. Thus, by means of pins 29, 33 and 34 and their respective races, the entire wedge system is held in direct contact with the cam system against the action of centrifugal force generated by rotation of these elements. This also effectively prevents noise due to slapping of the wedges against the cam faces when engaged by the rollers.

Figure 4:
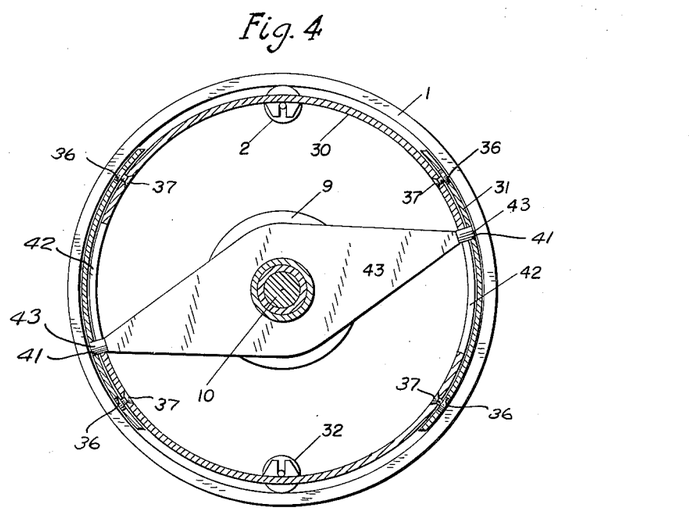

Fig. 4 shows in a section view, looking toward the engine, but omitting the transmission case, the control arm 43 bolted or otherwise fastened directly to cam 9. The outer ends of this arm project through slots 42 on opposite sides of cage 30, also through slots 41 on opposite sides of the control drum. This arrangement normally couples the cam 9 in fixed angular relation to the cage 30. hence, to rollers 2 and 32, and also, as will appear, to cam 8.

Figure 5:
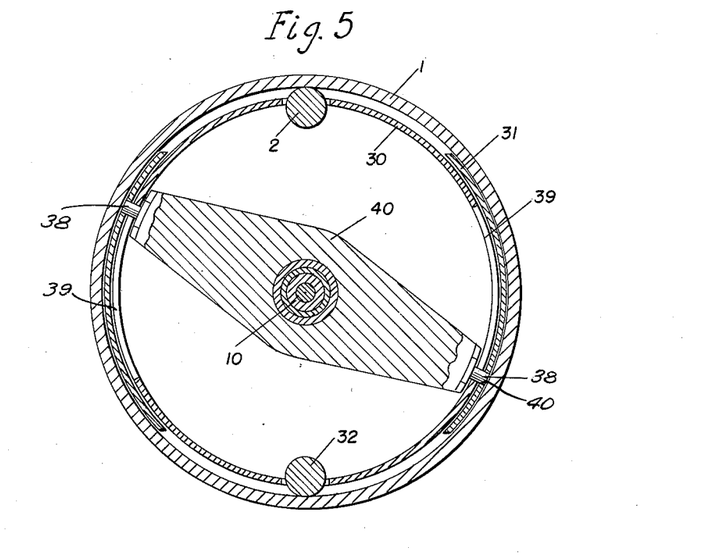

Fig. 5 shows in off-set section the control arm 40 bolted or otherwise rigidly fastened directly to cam 8. This control arm extends radially until near the inner face of cage 30 at which point it bends parallel to the axis and extends to alignment with slot 39 at which place it projects through the cage and through opening 38 in the control drum. This arrangement normally couples the cam 8 in a fixed angular relation to the cage 30, hence, to rollers 2 and 32, and also to cam 9.

Fig. 6 views one segmental portion of control drum 31, which has a corresponding portion on its opposite side. This view shows longitudinal slots 36 in the control drum, which are engaged by guide pins 37 fixed to, and projecting slightly above, the face of cage 30. These pins and slots permit the axial movement of the drum over the cage while insuring that these two parts rotate together. This figure also shows the manner in which opening 38 and slot 41 of the control drum are superimposed over slots 39 and 42, respectively, of the cage. The end of control arm 40 connected to cam 8 projects through slot 39 and opening 38. The end of control arm 43 connected to cam 9 projects through slots 42 and 41. When in the normal position, as shown here, the mechanical coupling of cams 8 and 9 with the cage 30 and its rollers 2 and 32 is such that the rollers always have clearance between the rim 1 and the faces of the wedges 3 as this mechanism is rotated by starting the engine.

Assume, now, that the engine is started in the customary manner with the control lever in the neutral position. Referring to Figs. 1A, 1B and 10, engine shaft 20 rotates in a counterclockwise direction, looking towards the engine, together with the parts keyed to it, namely, flange 26, rim 1, and the driving elements of the fluid drive unit. Since the mechanical linkage of the control elements under this condition prevents effective contact of rollers 2 or 32 with both rim 1 and wedge 3, there is practically no load on the driven element 27 of the hydraulic coupling; hence, this entire control mechanism including cam 8, cage 30, control drum 31, and cam 9 is rotated freely at almost engine speed by sleeve 28. Because the rollers have clearance between the rim 1 and the faces of the wedges, the latter together with disc 6 have no tendency to rotate regardless of the speed of the engine. As is customary in starting any vehicle, the engine normally is brought to idling speed before moving the control lever.

When the control lever 60 is moved forward for forward movement of the vehicle, it moves the shift arm 66 toward the engine. This causes the shift fork 67 to move the gear 71, collar 72 and gear 73 in the same direction. The gear 73 through internal splines, therefore, effectively couples countershaft 10 to drive shaft 70, which connects to the rear wheels through the usual universal and differential couplings (not shown). At the same time, the forward movement of control lever 60 causes roller 62 to move the thrust plate 59 axially on shaft 10 against the action of coil spring 57, thus moving plunger 54 a definite distance toward the engine. Thus the cone of plunger 54 forces rollers 53 outward, carrying the junctions of links 51 and 52 with it. This causes thrust ring 49, bell-cranks 47, thrust plate 44 and control drum 31 to be moved a definite distance toward the engine against the action of spring 35. The reactive force resulting from this motion is passed through plate 55 and thrust bearing 56 to the end section 58 of the transmission case. Very little axial thrust is now applied to plunger 54 because rollers 53 are on the flat portion of the cone. Spring 57 is held under slight compression by detent ball 69.

The movement of control drum 31 with respect to cage 30 can best be described by reference to Fig. 6. The initial movement of the drum causes the opening 38 to be moved over slot 39, thus within the limits of the slot, completely freeing control arm 40, which is connected to cam 8, thence, through sleeve 28 to the hydraulic coupling unit. The first part of slot 41 is parallel to the axis of rotation; hence, there is no change due to this initial movement of the drum in the angular relationship of cam 9 and rollers 2 and 32. One characteristic of the hydraulic coupling is its low efficiency at low speeds. Consequently, it is expected that little torque will be transmitted through the fluid drive at this time. However, with the coupling through control arm 40 broken, the cage 30 with cam 9 and control drum 31 starts to slow down with respect to cam 8. Due to the elongated shape of openings 38, the cam 8 is enabled to move several degrees in the direction of rotation with respect to cam 9 and rollers 2 and 32. Reference to Fig. 7 shows that only a small movement of cam 8 in advance of cam 9 and roller 2 causes the leading end 3a of wedge 3 to be lifted and therefore its face to come into engagement with roller 2 and it in turn into contact with rim 1. Since wedge 3 is not rotating this double contact of roller 2 brings it, and its supporting cage 30, to a rotational speed of one-half that of rim 1. This is evident, when it is recognized that rollers 2 and 32 are now acting virtually as a roller bearing between rim 1 and the faces of consecutive wedges 3, which present a continuous circumferential line of contact, due to the dynamic tilting of each wedge in succession by cam 8 and cam 9. Cam 8 can lift wedge 3 only a limited amount until encountering very great resistance to further relative movement; hence, it, also, is slowed down to a rotational speed of one-half that of engine speed. This increases the slippage in the hydraulic coupling to 50% but since the engine is still at idling speed there is only a slight tendency to move the car.

The next operation is for the driver to release the parking brake and rapidly increase the engine speed by depressing the accelerator. With the hydraulic coupling at 50% slippage, it is exceptionally responsive to this increase in engine speed and the torque transmitted therethrough is increased many fold. This torque is applied directly to cam 8 to tend to rotate it faster than the cage and cam 9. As a result, this torque is translated into a very great force, by virtue of the wedging action of cam 8, applied to lift the leading end 3a of wedge 3. This force causes wedge 3 to act as a lever and through its contact with roller 2 acting as a fulcrum to transmit this force directly to cradle 4 by a slight increase in the tilting movement of the wedge. The cradled end of wedge 3 moves in a short arc of a circle having the contact with roller 2 as the center. This free movement of wedge 3, therefore, exerts a very great force to cause cradle 4 and shaft 5 to rotate disc 6 together with countershaft 10. This produces the first increment of car movement which, due to the large torque amplification, is small in comparison to the movement of the engine, the fluid drive and cam 8. Due to the shape of the face of cradle 4, whereby the wedge 3 encounters an ever increasing steepness to movement, the acceleration or rate of increase of motion of disc 6 during this first increment is the greatest possible. Disc 6 with all other wedges than the two in direct contact with rollers 2 and 32 is, therefore, rotating at a certain speed when the rollers contact the next wedges. The contact of the roller with the second wedge will occur in the long leading face somewhat in advance of the corresponding point of contact on the first wedge face because cam 8 is advanced a few degrees relative to the roller and therefore lifts the leading end of the wedge into contact with the roller somewhat sooner. Since this wedge is already rotating with disc 6, the result of the roller contact is to increase the rotational speed of the cage and cam 9 slightly above one-half engine speed because both surfaces contacted by the roller are now rotating. This causes cage 30 and cam 9 to tend to pull away from cam 8, with the result that cam 8 is accelerated further by the torque through the hydraulic coupling, thereby tilting the second wedge to add another increment of acceleration to disc 6 and the other wedges. This action is repeated as each succeeding wedge is contacted by the rollers while the same relative positions of the wedging elements is maintained. After a wedge is tilted in this manner to transmit torque, it is immediately restored to its original seat in cradle 4, as soon as the roller moves off of it, by the slight friction of pin 29 in the races and of the contact of cam 8 with the leading end of the wedge. The trailing end of the contact face of wedge 3 is tapered off gradually for some distance so that the wedge, which the roller is leaving, will return to normal gradually as it follows the roller. Thus, as the rollers advance over the faces of the wedges, each, in turn, transmits a very great torque supplied from the engine through the hydraulic coupling and multiplied greatly by the wedging action of cam 8. Since the contact of the rollers with the wedges is continuous, this torque will be continuous. During this early stage of acceleration the rollers, acting like a roller bearing between the rim 1 and the wedges 3, will transmit only a small amount of direct mechanical torque induced by the friction of rolling over the faces of the wedges under heavy pressure. It should be noted that this friction aids instead of retards the acceleration. Also the friction between cam 8 and the wedge acts as a direct force to rotate the wedge, hence disc 6.

This condition exists until the car attains a certain speed during which period the slippage of the fluid drive decreases; hence, the torque transmitted decreases slightly, unless engine speed is increased correspondingly. Soon after the countershaft 10 starts to revolve, the weighted end 47a of bell-crank 47 by centrifugal action tends to fly out from its normal position against the shaft and to rotate the bell-crank about its pivot 48 in thrust ring 49. This creates a force to move thrust plate 44 toward the engine and a reactive force through thrust ring 49, links 51 and 52 against thrust plate 55, thence, through thrust bearing 56 to the transmission case. Opposing the force thus tending to move the thrust plate 44 is the relatively light compression of the coil spring 35 and the opposition of control arm 43 to movement beyond the bend in slot 41, which results in a relative movement of cam 9. By means of arm 7, cam 9 is bearing some of the thrust of wedge 3. Consequently, the ability of the centrifugal element to rotate cam 9 by moving control drum 31 toward the engine is dependent upon the torque actually being transmitted as well as the speed of the countershaft. The torque transmitted at any given speed is, of course, dependent upon the load and the acceleration, so the further movement of the control drum 31 over cage 30 begins at different speeds dependent upon these other factors. However, the centrifugal force increases about in proportion to the speed so, sooner or later, the thrust upon plate 44 causes control drum 31 to move axially with respect to cage 30. This causes the end of control arm 43 to be moved along the angular extension of slot 41 in the control drum and to rotate relative to cage 30 in slot 42. This produces a movement of cam 9 in a clockwise direction looking toward the engine relative to the rollers and cam 8. Actually this relative movement of cam 9 is produced by slightly slowing down its counter-clockwise movement. The relative movement of cam 9, therefore, lifts arm 7 slightly, which, through shaft 5 and cradle 4, lifts the trailing end of wedge 3 with respect to the roller 2 and cam 8. However, wedge 3 cannot be lifted by cradle 4 without forcing cam 8 backward or clockwise by a small amount against the torque through the fluid drive. It especially should be recognized that all these elements are rotating counter-clockwise at a comparatively high speed so these other movements are relative motions superimposed dynamically. The slight lifting of the trailing end of wedge 3 by the relative movement of cam 9, as just described, means that for the first time roller 2 is rolling slightly uphill in its contact with wedge 3. This compels wedge 3 to apply some direct mechanical torque to rotate disc 6 supplementing the larger torque still transmitted through the fluid drive and cam 8. Thus begins the transmission of a considerable direct mechanical torque from rim 1 through roller 2 to wedge 3. As the speed increases, this relative movement of cam 9 increases but it is a gradual action for, as cam 8 is forced backward, its contact with wedge 3 is moved toward its minimum diameter; hence cam 8 becomes a thinner wedge. Therefore, although the torque through the fluid drive is actually decreasing due to less slippage at the increased speed, the thinner wedging action of cam 8 maintains a great force to tilt wedge 3. Wedge 3 at this stage, being a free link, has a compound motion, one being the original tilting motion about its contact with roller 2 and, superimposed upon this, a mechanical movement due to roller 2 rolling up hill and using the contact with cam 8 as a fulcrum point to depress, directly, the cradle end of wedge 3. This latter action is equivalent to a variable overrunning clutch starting with a very thin wedging action and increasing, only, if the direct load on the engine does not slow it down, for, if this occurs, the centrifugal action becomes less and the force rotating cam 9 is relaxed somewhat, thereby reducing the direct clutching action. Consequently, the overrunning clutch action, which will eventually bring about the direct drive condition, is entirely automatic and is imposed only if the direct engine torque is able to absorb the direct load. As the speed of the vehicle increases, the centrifugal element 47 continues to increase the torque rotating cam 9 against cam 8. The torque through the hydraulic coupling becomes less and less as the relative speed of the driving and driven elements decreases; hence, the control arm 40 is eventually forced back against the shoulder 38a of opening 38 and no further relative movement of this cam can occur even though the torque through the fluid drive eventually becomes zero in the direct drive condition. The further increase in the centrifugal action of weight 47 simply increases the force of cam 9 wedging the roller 2 tighter against rim 1. Also, as the speed of disc 6 increases, the rolling of the roller 2 over the faces of the wedges decreases gradually until it ceases entirely, when the speed of the wedges becomes the same as the speed of the rim or direct drive. This direct mechanical linkage once attained remains stable as long as the vehicle speed is maintained above a certain rate. At this stage the wedged condition of the rollers 2 and 32 against the rim 1 is such that very great pressure exists and if rolling action of the rollers on the wedge faces is attempted, there is a higher part of the wedge on either side of the roller contact because the cams are rotating in unison with the wedges. Hence, this wedged condition is now essentially static and torque is transmitted therethrough in either direction at unity speed ratio of driving and driven shafts. There is no backlash when changing from a driving to a driven condition, no moving parts, no noise, and no friction, except normal bearing friction. The hydraulic coupling ceases to transmit torque, when both driving and driven elements rotate at equal speed.

The direct drive condition is maintained until the car speed is reduced either as a result of releasing the accelerator or encountering a load condition exceeding the capability of the direct torque of the engine. When the speed reaches a certain low value and the centrifugal action of weights 47 on wedge 3 through cam 9 becomes less than the direct torque transmitted by rollers 2 and 32 through wedge 3, then slippage begins. The rollers slowly start to roll over the wedges and a small amount of slippage occurs in the fluid drive. The torque through the fluid drive, however, will not be sufficient to cause wedge 3 to tilt, as in the first stages of acceleration, unless the speed drops to a lower value or the slowing down process is reversed by again depressing the accelerator pedal. In any case the engine will not stall, for, as the speed decreases, the slippage increases and the engine torque will again be amplified through the fluid drive to meet the load condition. If the car is brought to a full stop by use of the brake, the engine will drop to idling speed and maintain a slight tendency to move the car until the control lever 60 is moved to the neutral position. As the control lever is restored to neutral, the spring 57 causes plunger 54 and plate 59 to follow it to the normal position. The collapse of links 51 and 52 causes spring 35 to act to restore drum 41, plate 44, bellcranks 47, and thrust ring 49 all to their normal positions. With the control lever in neutral the drive shaft is again completely disengaged from the engine.

If the driver wishes to move the vehicle backward, he operates the control lever 60 to the reverse position. Since internal combustion engines run only in one direction, it is necessary to provide reversing gears so that the drive shaft may be driven in the opposite direction to that for forward movement. The shift arm 66, together with shift fork 67, is moved away from the engine. This causes gear 71 to engage idler gear 74 while gear 73 simultaneously engages gear 75. Idler gear 74 is always in mesh with internal teeth of gear 75. There is now established a reverse gear train from shaft 10, through splines to gear 71, which drives idler gear 74, which in turn drives gear 75 in a reverse direction and at a reduced speed. Gear 73, now meshed with gear 75, is splined to drive shaft 70. The operation of the control lever to the reverse position causes thrust plate 59 to be moved toward the engine the same amount as for forward movement. Consequently, the hydraulic-mechanical mechanism of cams and wedges operates exactly as described for forward movement to accelerate and drive the countershaft 10, thence, drive shaft 70 in a reverse direction producing backward movement of the vehicle.

The power transmission system herein disclosed has been described with particular reference to a preferred arrangement of parts and preferred operating characteristics. It will be understood, however, that modifications may be made without departure from the scope of the invention as defined by the accompanying claims.

I claim:

1. In a torque transmitting mechanism, drive means for connection to a source of power, an input shaft and a rim connected to said drive means, a first rotary cam, a second rotary cam and between said drive means and said first cam, a variable slip coupling, an output shaft and connected thereto a disc, a rotatable wedging system comprising a series of wedges, arms, cradles and rocker shafts, the said rocker shafts having bearings spaced circumferentially in said disc and each of said rocker shafts being connected to one of said arms and to one of said cradles, each of said wedges terminating in leading and trailing ends with its leading end contacting said first cam and its trailing end contacting one of said cradles, each of said arms contacting said second cam, a roller positioned between said rim and said wedges, and means controlled manually by an operator and centrifugally by said output shaft for adjusting the relative positions of said cams to tilt said wedges and cause them to be engaged by said rim through said roller.

2. In a torque transmitting mechanism, a first cam, a second cam, a rotating rim, a wedge controlled by said cams, and a roller arranged to be moved by said wedge into engagement with said rim upon movement of said first cam with respect to said second cam.

3. In a torque transmitting mechanism, a first cam, a second cam, a rim, a roller, a cradle, a disc pivotally carrying said cradle, a wedge in engagement with said first cam and through said cradle with said second cam, said roller being moved by said wedge into engagement with said rim upon intial movement of said first cam relative to said second cam and operating through said wedge and said cradle to rotate said disc upon further movement of said first cam relative to said second cam.

4. In a torque transmitting mechanism, a first cam, a second cam, a wedging system controlled by said cams, a cage, a roller carried in said cage and in position to be engaged by said system, and a control drum arranged to couple said cams and cage mechanically to prevent wedging action of said roller.

5. In a torque transmitting mechanism for automotive vehicles, a first cam, a second cam, drive means for one of said cams, a wedging system adapted to be controlled by said cams upon relative movements thereof and in turn to control the output of driving power, mechanical means to couple said cams to prevent dynamic action of said wedging system, a lever to determine the direction of vehicle movement, and means associated with said lever to release one of said cams from said mechanical means.

6. In a torque transmitting mechanism, an input shaft, two cams, a wedge jointly controlled by said cams, a driving rim, a roller in position to engage said wedge and said rim simultaneously, an output shaft, and a disc connected to said output shaft to drive the same, said disc carrying said wedge and arranged to be rotated by torque supplied from said input shaft through said rim, roller and wedge.

7. In a torque transmitting mechanism, a first cam, a second cam, an output shaft, a disc for driving said output shaft and carrying a rocker shaft terminating at one end in an arm in contact with said second cam and at the other end in a cradle, a wedge terminating in leading and trailing ends contacting said first cam and seated in said cradle, respectively, a power driving rim, a roller, means for moving said first cam relatively ahead of said second cam thereby tilting said wedge and causing it to move said roller into engagement with said rim and apply force at its trailing end against said cradle, the seat of said cradle being shaped to provide maximum acceleration of said disc by the said tilting of said wedge.

8. In a torque transmitting mechanism, a first cam, a second cam, an output shaft, a disc for driving said output shaft and carrying a rocker shaft terminating at one end in an arm in contact with said second cam and at the other end in a cradle, a wedge terminating in leading and trailing ends contacting said first cam and seated in said cradle, respectively, a power driving rim, a roller, and means for causing said second cam to lag behind said first cam thereby tilting said wedge at its trailing end.

9. In a torque transmitting mechanism, a plurality of cams, a wedge in tilting engagement with said cams, and a roller in contact with said wedge, means for imparting circular movement of said roller over the surface of said wedge, said surface being less convex than the circumferential line of contact therewith of said roller, and the said cams being shaped to permit such circular movement of the roller during uniform rotation of said cams.

10. In a torque transmitting mechanism, an input shaft, a first cam, a second cam, a wedge controlled by said cams, a cage carrying a roller in position to be engaged by said wedge to act as a power link of said mechanism, an output shaft, a drum for controlling the position of said cams relative to said roller, centrifugal mechanism rotating with said output shaft, and means associated with said centrifugal mechanism to move said drum to activate said roller.

11. In a torque transmitting mechanism, a first cam, a second cam, a rotating rim, a roller, a disc to be driven, a rocker shaft carried by said disc, a cradle and an arm secured to said shaft, a wedge having a leading end contacting said first cam and a trailing end contacting said cradle, said arm being in contact with said second cam, centrifugal means associated with said disc and operating to adjust the position of said cams relative to said roller to cause said arm to lift the trailing end of said wedge, thereby producing a linkage for direct mechanical torque through said roller, wedge, cradle and rocker shaft to drive said disc.

12. In a torque transmitting mechanism, drive means for connection to a source of power, a variable slip coupling, a first cam normally driven by said drive means through said coupling, a rim in direct driven connection with said drive means, a second cam normally moved uniformly with said first cam, an output shaft, a wedging system interposed between said rim and said cams under joint control of said cams, centrifugal means operated by said output shaft and controlling the relative positions of said cams, thereby gradually effecting the transfer of power to said output shaft from said coupling through said wedging system to direct drive by way of said rim and said wedging system, said centrifugal means acting in conjunction with said wedging system.

13. In a torque transmitting mechanism, drive means for connection to a source of power, a first cam, a variable slip coupling between said drive means and said cam for driving said cam, a shaft, and means in mechanical torque-transmitting relation between said drive means and said shaft and including a second cam rotatable relatively to said shaft, and a wedging system under the control of said cams, said second cam being arranged in conjunction with said wedging system to cause the application of direct mechanical torque to said shaft simultaneously with torque transmitted thereto through said coupling.

14. In a torque transmitting mechanism, means for connection to a source of power, a rotating rim directly connected to said means, a variable slip coupling, a first cam connected to said means through said coupling, an output shaft, a second cam, a wedging system cooperating with said shaft and said cams and including a roller adjacent said rim, and controlling means to move said second cam relative to said first cam against the torque applied to said first cam through said coupling, thereby causing a gradual increase in direct mechanical torque applied to said output shaft by way of said rim, roller and wedging system, and a gradual decrease in the torque applied to said output shaft through said coupling by way of said first cam and wedging system.

15. In a torque transmitting mechanism, a first cam, a second cam, said cams being relatively movable, drive means including a rotatable rim, a roller adjacent said rim, a disc to be driven, and a plurality of wedges carried by said disc, each said wedge being jointly controlled by said cams, said wedges being effectively angularly spaced from each other and shaped to be engaged consecutively by said roller to provide continuous torque to said disc.

16. In a torque transmitting mechanism, a first cam, a second cam, a rotating rim, a cage carrying a roller adjacent said rim, a variable slip coupling in position to transmit power to said first cam, a disc adapted to be driven jointly by said coupling through said first cam and by said rim through said roller, said disc carrying a plurality of wedges having faces in position to be engaged by said roller, the position of said wedges being controlled jointly by said cams, and a drum for controlling the angular relationship of said cams to each other during their rotational movement, the arrangement being such that the maintenance of any given angular relationship of said cams is independent of the rotational speed of said disc while said disc is being jointly driven.

17. In a torque transmitting mechanism, a first cam, a second cam, a disc to be driven, a variable slip coupling for transmitting torque to said first cam, a rotating rim, wedging apparatus positioned for rotation with said disc, an element to be wedged by said wedging apparatus and to be engaged by said rim, controlling apparatus normally maintaining said cams in fixed angular relationship to each other and arranged to displace said first cam from said second cam, thereby bringing said wedging apparatus into action and amplifying the torque supplied by said coupling.

18. In a torque transmitting mechanism, a first cam, a second cam, a cage carrying rollers, a rotating rim, a plurality of wedges in position to be engaged in succession by said rollers, a control drum arranged normally to cause said cams and said cage to rotate as a unit and thereafter to free said first cam, thereby causing said rollers to engage said wedges and said rim with rolling contact, whereby said cage and said cams are brought to a speed of one-half that of said rim.

19. In a torque transmitting system, the combination with a driving element, a driven element, and a roller in proximity to said driving element, of a series of wedges carried by said driven element and in position to be engaged by said roller, two cams normally held to move in unison and being so formed that they normally rock said wedges so as to escape wedging and permit engagement thereof by said roller, and means for adjusting the relative positions of said cams while in motion to vary the rocking action of said wedges, said roller being thereby brought into simultaneous rolling engagement with said driving element and said series of wedges whereby power is exerted to move said driven element at a speed less than that of said driving element.

20. In a torque transmitting system, the combination with a driving element, a driven element, and a roller in proximity to said driving element, of a series of wedges carried by said driven element and in position to be engaged by said roller, two cams normally held to move in unison and being so formed that they normally rock said wedges so as to escape wedging and permit engagement thereof by said roller, means for adjusting the relative positions of said cams while in motion to vary the rocking action of said wedges, said roller being thereby brought into simultaneous rolling engagement with said driving element and said series of wedges whereby power is exerted to move said driven element at a speed less than that of said driving element, and additional means cooperating with said first mentioned means to further adjust the relataive positions of said cams, said roller being thereby brought into fixed engagement with said driving element and some one of the wedges, whereby power is applied directly to said driven element to move the same at no reduction in speed.

21. In a torque transmitting system for automotive vehicles and the like, the combination with an engine and a drive shaft, of a first cam, a flexible coupling between said engine and said cam, a second cam, a driving rim directly coupled to said engine, a disc, a control lever to connect said disc to said drive shaft, a series of wedges tiltably controlled by said cams and rotatably carried by said disc, a roller in position to be engaged by said rim and said wedges, centrifugal means in operative association with said disc, a drum normally holding said cams and said roller against relative rotation while permitting rotation therewith in unison, means under the control of said lever and acting through said drum to release said first cam from said roller whereby said roller is brought into rolling contact with said rim and into successive rolling contact with said wedges, and means under the control of said centrifugal means and acting through said drum for releasing said second cam from said roller, whereby said roller is locked into fixed contact with said rim and some one of said wedges.

22. In a torque-transmitting mechanism, a first cam, a second cam, a wedge positioned at spaced points by said cams, whereby said wedge may be tilted upon a uniform relative movement of said wedge and of said cams, means rendering one of said cams movable relatively to the other, a roller, and means positioning said roller to escape engagement by said wedge upon the uniform movement of said cams and to be engaged by said wedge upon movement of one of said cams with respect to the other.

23. In a torque-transmitting mechanism, a first rotary cam, a second rotary cam, a wedge positioned at spaced points by said cams, whereby said wedge may be tilted upon a uniform relative movement of said wedge and of said cams, and means for moving one of said cams relatively to the other, whereby the tilting action of said wedge may be modified.

24. In a torque-transmitting mechanism, a wedge, means providing two spaced points of support for said wedge whereby said wedge may be tilted in accordance with the positioning of said means at said spaced points, said means including a cam movable relatively to said wedge, an output shaft driven by said wedge, and means responsive to developed output speed and connected to said cam, whereby said cam may tilt said wedge for greater wedging action with increasing output speed.

WALTER P. ALBERT.

REFERENCES CITED

The following references are of record in the file of this patent:

UNITED STATES PATENTS

| Number | Name | Date |
| --- | --- | --- |
| 828,064 | Slater | Aug. 7, 1906 |
| 1,197,309 | Staude | Sept. 5, 1916 |
| 1,312,328 | Johansson | Aug. 5, 1919 |